Nov. 22, 1927.
M. C. RISHER
1,650,301
ROTARY DRILL CONNECTION
Filed May 19, 1926
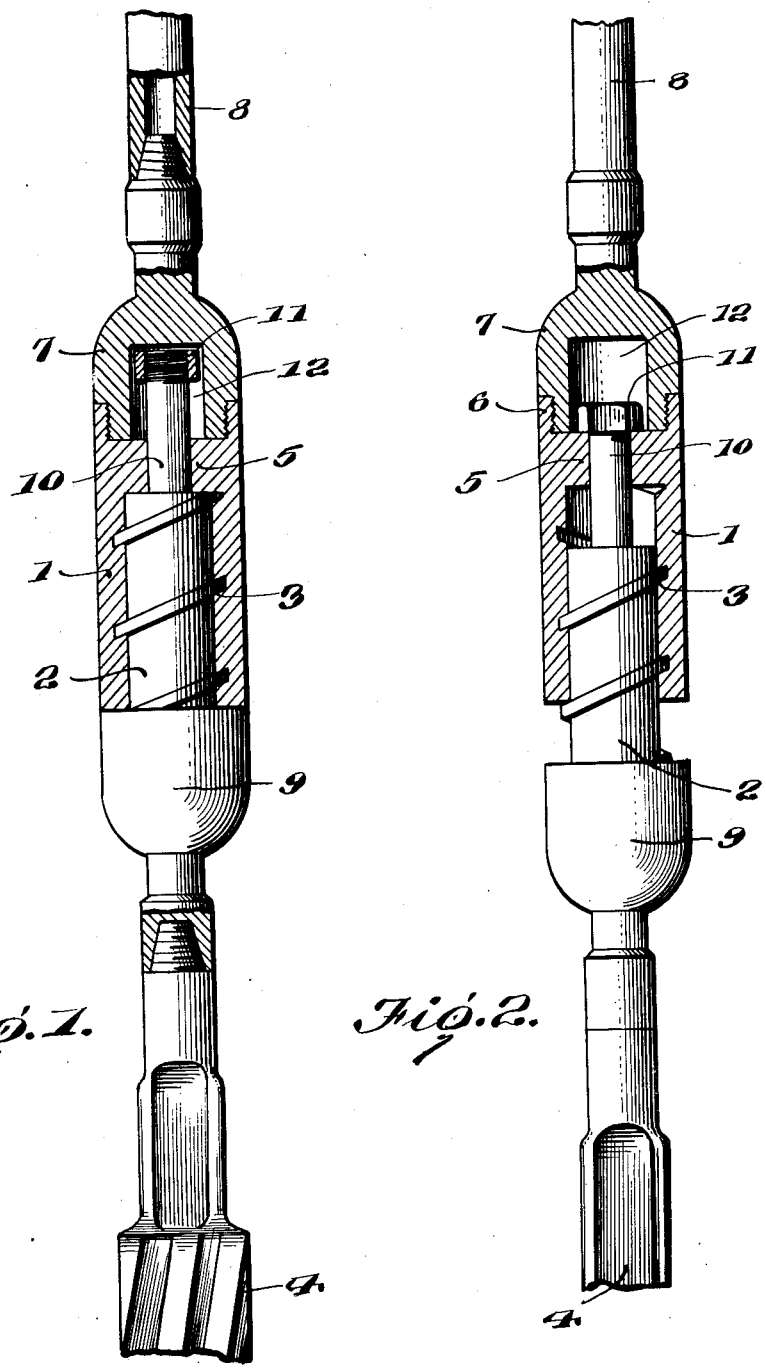
Inventor
M. C. Risher,
By Lacy & Lacy, Attorneys Patented Nov. 22, 1927.

1,650,301

UNITED STATES PATENT OFFICE.

MERRILL C. RISHER, OF OILTON, OKLAHOMA.

ROTARY-DRILL CONNECTION.

Application filed May 19, 1926. Serial No. 110,194.

The present invention aims to facilitate the drilling of deep wells and minimize the cost, whether operating in hard or soft formations.

The invention contemplates a connection to be interposed between the drill and the drill stem, whereby to impart a rotary movement to the drill when it strikes the bottom of the hole, thereby causing the drill to cut faster, mix mud quickly and prevent sticking, thereby saving casing when the same is required to shut off water.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof reference is to be had to the following description and the drawings hereto attached, in which,—

Figure 1 is an elevational view partly in section, of a rotary drill connection, embodying the invention, the parts being closed, and Figure 2 is a similar view, the parts being open.

Corresponding and like parts are referred to in the following description and designated in both views of the drawings by like reference characters.

The connection comprises a barrel 1 and a drill stock 2, a quick screw thread 3 being provided between the two, whereby to impart a rotary movement to the drill stock when the drill 4 reaches the bottom of the hole upon the down stroke. The barrel 1 is open at its lower end and closed at its upper end, as indicated at 5, and is formed with an upstanding collar 6 which is internally screw-threaded to receive the lower reduced end of a cap 7 to which the drill stem 8 is coupled in any preferred way.

The drill stock 2 is provided with a base 9 to which the drill 4 is attached, said base being of a diameter corresponding with the diameter of the barrel 1. A pin 10 projects from the upper end of the drill stock 2 and passes loosely through an opening formed in the closed end 5 of the barrel, the upper end of the pin being threaded to receive a nut 11 which constitutes a stop to limit the upward movement of the barrel, as indicated most clearly in Figure 2. The opening 12 of the cap 7 is of a size to admit of the nut 11 having a limited vertical movement, whereby upon the up stroke of the drill stem 8, the barrel 1 moves upon the drill stock 2, so that upon the down stroke the barrel 1 will move downwardly upon the drill stock when its movement is arrested by the drill striking the bottom of the hole, thereby imparting a rotary movement to the drill stock and drill. Upon the initial up-stroke of the drill stem 8, the barrel 1 receives a corresponding upward movement, thereby imparting a reverse rotation to the drill stock and drill, which prevents the latter from sticking and causes a rapid mixing of the mud. It will also be understood that the drill 4 is rotated when boring, thereby facilitating its operation and at the same time mixing the mud, and preventing sticking.

Having thus described the invention, I claim:

A rotary drill connection comprising a barrel, a closure for the upper end thereof provided with an opening, the upper end of the barrel having an upstanding collar, a cap removably fitted to the collar of the barrel, a drill stock within the barrel and having a quick screw-thread connection therewith and provided at its lower end with a base, and having a pin at its upper end passing through the opening of the closure for movement in the cap, and a nut threaded upon the upper end of the pin and also movable in the cap.

In testimony whereof I affix my signature.

MERRILL C. RISHER. [L. S.]